United States Patent
Ishikawa et al.

(10) Patent No.: US 6,292,111 B1
(45) Date of Patent: Sep. 18, 2001

(54) VEHICLE-APPLIED REAR-AND-SIDE MONITORING SYSTEM AND VEHICLE-APPLIED REAR-AND-SIDE MONITORING AND ALARMING SYSTEM

(75) Inventors: Naoto Ishikawa; Kazutomo Fujinami; Keiki Okamoto, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/514,948

(22) Filed: Feb. 28, 2000

(30) Foreign Application Priority Data

Mar. 1, 1999 (JP) .................................................. 11-052435

(51) Int. Cl.[7] .................................................. G08G 1/017
(52) U.S. Cl. .......................... 340/937; 340/435; 340/436; 340/903; 180/167
(58) Field of Search .................................... 340/435, 436, 340/901, 903, 905, 937, 988; 180/167, 169, 170; 348/118, 119, 148

(56) References Cited

U.S. PATENT DOCUMENTS

| | | | |
|---|---|---|---|
| 5,350,912 | * | 9/1994 | Ishida ................................... 180/170 |
| 5,874,904 | * | 2/1999 | Hirabayashi et al. ................ 340/903 |
| 6,005,492 | * | 12/1999 | Tamura et al. ........................ 340/937 |
| 6,053,268 | * | 4/2000 | Yamada ................................. 180/167 |

FOREIGN PATENT DOCUMENTS

| | | |
|---|---|---|
| 6-107096 | 4/1994 | (JP) . |
| 7-50769 | 2/1995 | (JP) . |
| 2641562 | 5/1997 | (JP) . |

* cited by examiner

Primary Examiner—Van T. Trieu
(74) Attorney, Agent, or Firm—Armstrong, Westerman, Hattori, McLeland & Naughton, LLP

(57) ABSTRACT

A vehicle-applied rear-and-side monitoring system wherein a monitoring area is set inside or outside an area enclosed with lines connecting two lane marking positions, where two lane markings on both sides of a preceding vehicle running lane in the road image cross a periphery of the road image, to an infinity point in the road image, which infinity point corresponding to a detected rudder angle. Further, a vehicle-applied rear-and-side monitoring and alarming system which a alarms a drives when the following vehicle was detected as a result of monitoring a rear-and-side road view by was of the vehicle-applied rear-and-side monitoring system.

16 Claims, 9 Drawing Sheets

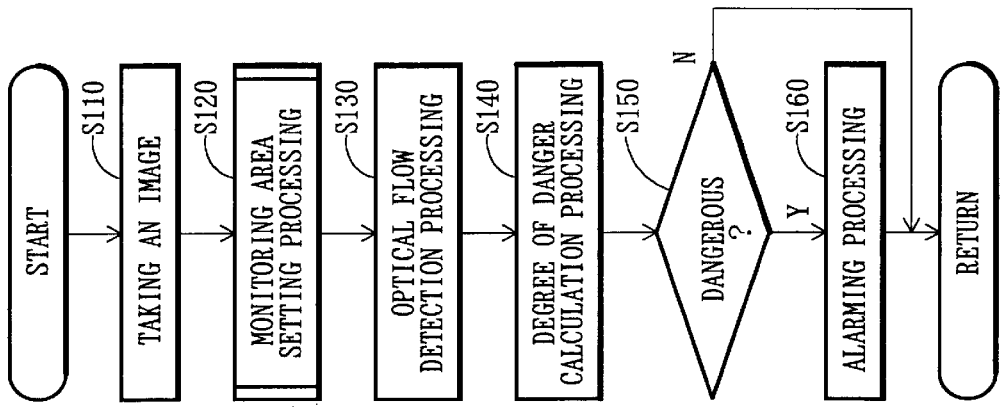
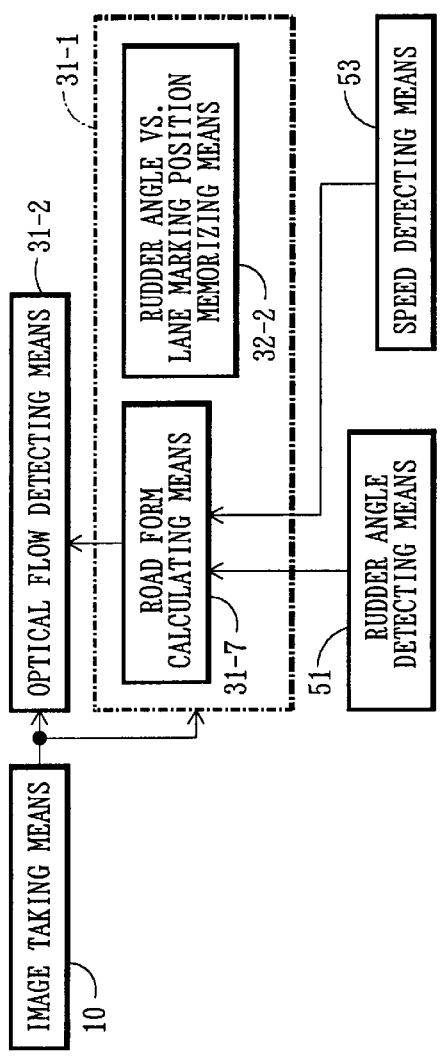
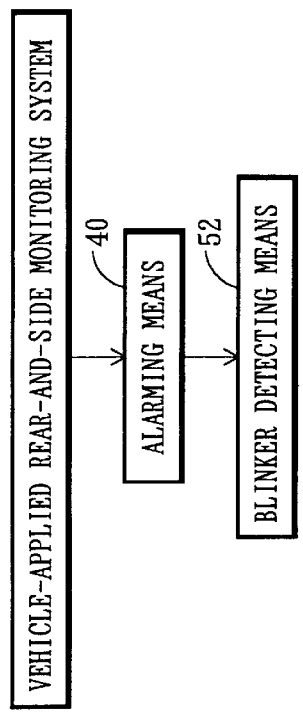

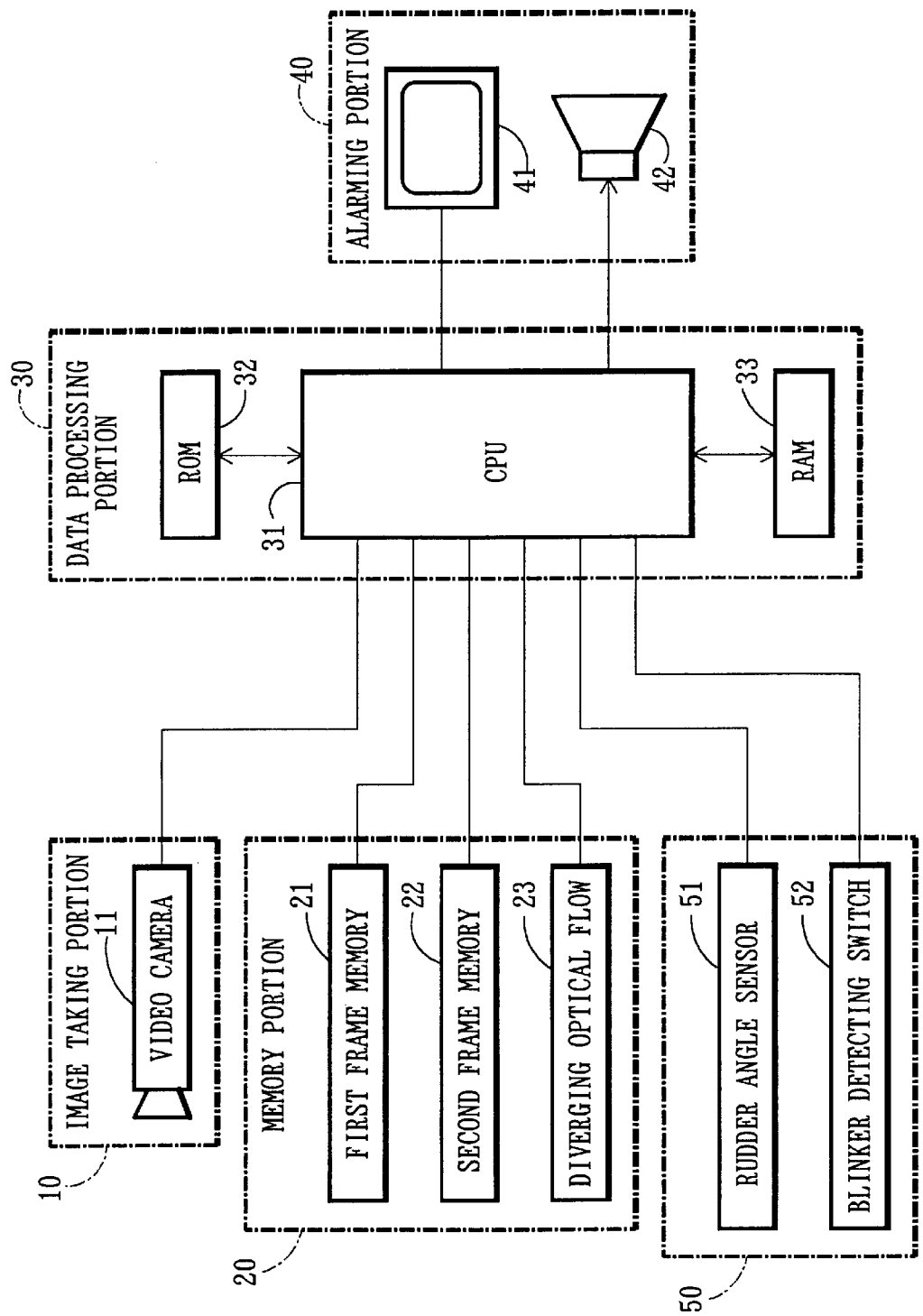

| RUDDER ANGLE | FOE |
|---|---|
| θ | +ΔFOE |
| ⋮ | ⋮ |
| −θ | −ΔFOE |

| RUDDER ANGLE | FOE | LANE MARKING POSITION | |
|---|---|---|---|
| | | W2′ | W1′ |
| θ | +ΔFOE | x,y | x,y |
| ⋮ | ⋮ | ⋮ | ⋮ |
| −θ | −ΔFOE | | |

VEHICLE-APPLIED REAR-AND-SIDE MONITORING SYSTEM AND VEHICLE-APPLIED REAR-AND-SIDE MONITORING AND ALARMING SYSTEM

BACKGROUND OF THE INVENTION

1. Field of the Invention

The present invention generally relates to a vehicle-applied rear-and-side monitoring system and vehicle-applied rear-and-side monitoring and alarming system and more particularly, to a vehicle-applied rear-and-side monitoring system, which monitors a rear-and-side of a running vehicle, i.e. own vehicle, such as a motor vehicle by taking an image of a rear-and-side road view of the own vehicle by an image taking means such as a video camera and the like set on the own vehicle and by detecting a following vehicle being approaching the own vehicle from the rear-and-side with use of the taken road image, and to a vehicle-applied rear-and-side monitoring and alarming system, which alarms a driver when the above monitoring system have detected a danger.

2. Description of the Related Art

For example, Japanese Patent No. 2641562 (hereinafter JP '562), Japanese Patent Application Laid-open No. 6-107096 (hereinafter JP '096) and also Laid-open No. 7-50769 (hereinafter JP '769) disclose a vehicle-applied rear-and-side monitoring and alarming system, which correctly recognizes a neighboring traffic lane of a traffic lane on which an own vehicle is running, and which gives a driver of the own vehicle an alarm of dangerousness of a collision when the driver is going to change the lane in case that a following vehicle is running on the neighboring lane, thereby avoiding a collision with the following vehicle.

The above system recognizes a lane marking on the road so as to distinguish traffic lanes with use of a road image taken by a video camera and sets a monitoring area on the neighboring lane. This system is intended to reduce an image-processing amount for detecting the following vehicle in the neighboring lane, i.e. in the monitoring area, so that the following vehicle in the neighboring lane can be detected fast and surely.

JP '096 and JP '769 disclose the system applying an optical flow, which will be briefly described with reference to FIGS. 13 and 14.

FIG. 13 is a block diagram showing a prior art vehicle-applied rear-and-side monitoring and alarming system, wherein 10 indicates an image taking portion used as an image taking means and has a video camera 11 for example. And, 30 is a data processing portion use as an arithmetical unit, and 42 is a speaker use as an alarming means.

The image taking portion 10 is arranged at a required position on a rear side, e.g. over the trunk room, of the own vehicle for taking a rear-and-side road view of the vehicle. The data processing portion 30 has CPU 31 (i.e. a central processing unit) to operate according to a program, ROM 32 to keep the program for the CPU 31 and a preset value, and RAM 33 to temporary keep required data for calculation by the CPU 31. The speaker 42 is arranged inside the own vehicle and raises a voice or an alarm sound on the basis of a signal from the CPU 31 of the data processing portion 30 so as to have the driver take notice of the danger.

FIGS. 14A–14C are explanatory illustrations showing change of a rear-and-side road image taken by the image taking portion 10. FIG. 14A is of at a time t, and FIG. 14B is of at a time t+Δt.

In these figures, 200 indicates a following vehicle running at the rear-and-side of the own vehicle, 300 indicates a road sign standing on one side of the road 500, and 400 indicates a building neighboring the road 500.

When the own vehicle is running straight on a plain road, the road sign 300 and the building 400 go away and therefore their images become small, as time goes by. That is, the road sign 300 and the building 400 in the image of FIG. 14B are smaller than those shown in FIG. 14A.

Description is given below to an optical flow with reference to these figures.

There can be a plurality of subject points, for example, on the following vehicle 200, the road sign 300, and the building 400 such as 201a,202a,301a,302a,303a,401a and 402a at the time t in FIG. 14A and 201b,202b,301b,302b, 303b,401b and 402b at the time t+Δt in FIG. 14B. Speed vectors connecting the corresponding subject points are obtained as optical flows such as 201F,202F,301F,302F, 303F,401F and 402F shown in FIG. 14C.

Here, the optical flow is acknowledged to be radially formed from an infinity point in the road image, which infinity point is defined as FOE (i.e. Focus of Expansion). In an image wherein the own vehicle is running straight, the FOE is positioned at the opposite point to the running direction of the vehicle.

Optical flows of objects being going away from the own vehicle become vectors to converge on the FOE, and optical flows of objects being approaching to the own vehicle become vectors to diverge from the FOE.

Accordingly, since the optical flows 201F and 202F of the following vehicle 200 are vectors in a diverging direction, the following vehicle is judged to be approaching to the own vehicle.

Length of the optical flow is in proportion to a distance per unit time, i.e. speed difference, between the own vehicle and the object and also in proportion to a distance itself between the own vehicle and the object. This will be described with reference to FIG. 15.

FIG. 15 is a theoretical scheme showing an optical arrangement, wherein $11a$ indicates a lens of the video camera of the image taking portion 10, $11b$ indicates an image plane of the video camera, f indicates a distance from the lens $11a$ to the image plane $11b$, P(Xa,Ya,Za) indicates a point on the following vehicle, and p(xa,ya) on the image plane $11b$ indicates a corresponding point to the point P.

Based on the above scheme in FIG. 15, a following equation is obtained due to the similar triangles.

$$xa = f \cdot Xa/Za \qquad (1)$$

By differentiating the equation (1) an equation (2) is obtained.

$$Xa' = (\Delta xa/\Delta t \cdot Za + xa \cdot Za')/f \qquad (2)$$

The x component u of the optical flow is obtained as follows:

$$u = \Delta xa/\Delta t \qquad (3)$$

Then, from the equation (3):

$$Za = (f \cdot Xa' - xa \cdot Za')/u \qquad (4)$$

Za' in the equation (4) is a speed difference or a relative speed between the following vehicle 200 (FIG. 14A) and the own vehicle.

By replacing the relative speed Za' with "−α" the equation (4) is becomes:

$$Za = (f \cdot Xa' + xa \cdot \alpha)/u \quad (5)$$

Accordingly, the x component u of the optical flow can be given with the following equation (6).

$$u = (f \cdot Xa' + xa \cdot \alpha)/Za \quad (6)$$

Ya, i.e. the Y-axis of the point P, can be obtained similarly.

Accordingly, based on the equation (6), the smaller the above Z is, that is, the smaller the distance to the following vehicle 200 is, or the larger the above α is, that is, the larger the relative speed is, the larger the x component of the optical flow is. This also applies to Y-direction.

Then, the smaller the distance to the following vehicle 200 is and further the larger the relative speed is, the longer the optical flow is, and then the optical flow diverges from the FOE. It can be understood that the longer the optical flow is, the bigger the danger with the following or adjoining vehicle is.

Accordingly, the data processing portion 30 judges that the object on the road exists near the own vehicle or is approaching thereto with a high speed when the optical flow is a vector in a diverging direction and simultaneously is large, and that degree of danger is high.

And, when degree of danger is judged high, the speaker 42 makes a driver know the situation.

Optical flows of objects on the image can be obtained similarly to the above, and thereby degree of danger with each of the objects can be judged. And, a driver can be given an alarm according to the degree of danger, thereby preventing a dangerous state or an actual trouble.

In the prior art, as shown in FIG. 16, the monitoring area is separated, by lane markings defining the own vehicle running lane, to an area of the own vehicle running lane and an area of the neighboring lanes on both sides of the own vehicle running lane so that required processing time can be decreased thereby to attain high speed processing. And, the FOE is detected by extending the lane markings, and the following vehicle 200 in the own vehicle running lane area or in the neighboring lane area is detected by obtaining its optical flow, and degree of danger with the following vehicle 200 running at the rear or on the neighboring lanes is judged according to length of the optical flow.

Among currently proposed methods of detecting the optical flow, one having reached to the practical level is the correlation method, which requires enormous calculation since a corresponding point of each of the picture elements in the image is searched for calculating a correlation value. The method has, however, an advantage that the optical flow can be relatively correctly obtained even though the image is complicated.

More specifically, in a general correlation method, when the optical flow is obtained from the image at a time T, the corresponding point of each of all the picture elements in the image at the time T have to be searched in the image at the time T−ΔT, which requires enormous calculation and simultaneously has a problem of bringing about a miscorrespondence.

Therefore, a monitoring area is considered to be set in order to decrease the processing time and to raise an accuracy of the detection.

With respect to the vehicle-applied rear-and-side monitoring and alarming system disclosed in JP '562, since the monitoring area is set with use of the lane markings detected and recognized in the road image taken by the video camera, processing of recognition of the lane markings needs relatively long time, thereby limiting possibility of shortening the processing time.

Especially, there is much difficulty in recognizing lane markings of the curved road.

Further, the monitoring area could not be set during night or a rainy day since lane markings is difficult to be recognized.

SUMMARY OF THE INVENTION

In view of the foregoing, an object of the present invention is to provide a vehicle-applied rear-and-side monitoring system wherein an monitoring area can be set correspondingly to the traffic lanes in the road image without using the lane markings to be detected in the road image and also a vehicle-applied rear-and-side monitoring and alarming system which gives a drive an alarm in case that the vehicle-applied rear-and-side monitoring system detected the danger.

In order to achieve the above-described object, as a first aspect of the present invention and as shown in FIG. 1A, a vehicle-applied rear-and-side monitoring system to be set on a first vehicle includes: an image taking means 10 for taking an image of a rear-and-side road view of the first vehicle so as to obtain a road image every definite period of time; a monitoring area setting means 31-1 for setting a monitoring area in the road image for monitoring a second vehicle; an optical flow detecting means 31-2 for detecting an optical flow deriving from the second vehicle to be in the monitoring area in two serial road images so as to monitor a relative position between the first vehicle and the second vehicle; and a rudder angle detecting means 51 for detecting a rudder angle of the first vehicle, wherein the monitoring area setting means sets the monitoring area inside or outside an area enclosed with lines connecting two lane marking positions, where two lane markings on both sides of a first vehicle running lane in the road image cross a periphery of the road image, to an infinity point in the road image, which infinity point corresponding to the rudder angle detected by the rudder angle detecting means.

In the above vehicle-applied rear-and-side monitoring system, the image taking means 10 takes an image of a rear-and-side road view of the first vehicle so as to obtain a road image every definite period of time, and the monitoring area setting means 31-1 sets a monitoring area in the road image for monitoring a second vehicle. And, the optical flow detecting means 31-2 detects an optical flow deriving from the second vehicle to be in the monitoring area in two serial road images so as to monitor a relative position between the first vehicle and the second vehicle.

The monitoring area setting means sets the monitoring area inside or outside an area enclosed with lines connecting two lane marking positions, where two lane markings on both sides of a first vehicle running lane in the road image cross a periphery of the road image, to an infinity point in the road image, said infinity point corresponding to the rudder angle detected by the rudder angle detecting means 51.

According to the above-described structure, since the two lane marking positions, where the lane markings on both sides of the own vehicle running lane cross the periphery of the road image taken by the image taking means, is detected in advance and the infinity point in the road image is determined according to the own vehicle's rudder angle, the monitoring area can be set inside or outside an area enclosed with lines connecting the two lane marking positions to the infinity point without detecting the lane markings themselves. Further, since the infinity point which moves as time passed is set correspondingly to the own vehicle's rudder angle, the monitoring area can be almost correctly set.

As a second aspect of the present invention, in the structure with the above first aspect, the monitoring area setting means has a rudder angle vs. infinity point memorizing means 32-1 for memorizing the infinity point correspondingly to the rudder angle of the first vehicle and decides the infinity point corresponding to the rudder angle detected by the rudder angle detecting means by reading out the infinity point from the rudder angle vs. infinity point memorizing means.

According to the above-described structure, since the monitoring area is set accordingly to the infinity point which is stored accordingly to the rudder angle and is read out correspondingly to the own vehicle's rudder angle, the monitoring area can be set only by detecting the own vehicle's rudder angle, without a bothersome calculation processing.

As a third aspect of the present invention, in the structure with the above first or second aspect, the monitoring area setting means has a rudder angle vs. lane marking position memorizing means 32-2 for memorizing the two lane marking positions correspondingly to the rudder angle of the first vehicle and decides the two lane marking positions corresponding to the rudder angle detected by the rudder angle detecting means by reading out the two lane marking positions from the rudder angle vs. lane marking position memorizing means.

According to the above-described structure, since the monitoring area is set accordingly to the two lane marking positions which are stored accordingly to the rudder angle and is read out correspondingly to the own vehicle's rudder angle, the monitoring area can be set only by detecting the own vehicle's rudder angle, without a bothersome calculation processing.

As a fourth aspect of the present invention, in the structure with the above first or second aspect, the monitoring area setting means decides the two lane marking positions by image-processing a periphery of the road image taken by the image taking means.

According to the above-described structure, since the monitoring area is set by using the two lane marking positions which are decided by image-processing the periphery of the road image taken by the image taking means, the monitoring area can be set only by image-processing a small area, without a bothersome calculation processing.

Also, in order to achieve the above-described object, as a fifth aspect of the present invention and as shown in FIG. 1B, a vehicle-applied rear-and-side monitoring system to be set on a first vehicle includes: an image taking means 10 for taking an image of a rear-and-side road view of the first vehicle so as to obtain a road image every definite period of time; a monitoring area setting means 31-1 for setting a monitoring area in the road image for monitoring a second vehicle; and an optical flow detecting means 31-2 for detecting an optical flow deriving from the second vehicle to be in the monitoring area in two serial road images so as to monitor a relative position between the first vehicle and the second vehicle, wherein the monitoring area setting means has a straight line detecting means 31-3 for detecting a plurality of straight lines by executing an edge processing to the road image and an infinity point deciding means 31-4 for deciding an intersection of the plurality of straight lines as an infinity point in the road image and sets the monitoring area inside or outside an area enclosed with lines connecting two lane marking positions, where two lane markings on both sides of a first vehicle running lane in the road image cross a periphery of the road image, to the infinity point in the road image.

According to the above-described structure, since the two lane marking positions, where the lane markings on both sides of the own vehicle running lane cross the periphery of the road image taken by the image taking means, is detected in advance and the infinity point in the road image is determined from the intersection of the straight lines detected by the image processing, the monitoring area can be set inside or outside an area enclosed with lines connecting the two lane marking positions to the infinity point without detecting the lane markings themselves. Further, since the infinity point can be set simply and correctly, the monitoring area can be almost correctly set.

Further, in order to achieve the above-described object, as a sixth aspect of the present invention and as shown in FIG. 1C, a vehicle-applied rear-and-side monitoring system to be set on a first vehicle includes: an image taking means 10 for taking an image of a rear-and-side road view of the first vehicle so as to obtain a road image every definite period of time; a monitoring area setting means 31-1 for setting a monitoring area in the road image for monitoring a second vehicle; and an optical flow detecting means 31-2 for detecting an optical flow deriving from the second vehicle to be in the monitoring area in two serial road images so as to monitor a relative position between the first vehicle and the second vehicle, wherein the monitoring area setting means has a stationary object's optical flow detecting means 31-5 for detecting a plurality of optical flows deriving from stationary objects in two serial road images and an infinity point deciding means 31-6 for deciding a convergent point of the plurality of optical flows as an infinity point in the road image and sets the monitoring area inside or outside an area enclosed with lines connecting two lane marking positions, where two lane markings on both sides of a first vehicle running lane in the road image cross a periphery of the road image, to the infinity point in the road image.

According to the above-described structure, since the two lane marking positions, where the lane markings on both sides of the own vehicle running lane cross the periphery of the road image taken by the image taking means, is detected in advance and the infinity point in the road image is determined from the convergent point of the optical flows detected by the image processing, the monitoring area can be set inside or outside an area enclosed with lines connecting the two lane marking positions to the infinity point without detecting the lane markings themselves. Further, since the infinity point can be set simply and correctly, the monitoring area can be almost correctly set.

Still further, in order to achieve the above-described object, as a seventh aspect of the present invention and as shown in FIG. 1D, a vehicle-applied rear-and-side monitoring system to be set on a first vehicle includes: an image taking means 10 for taking an image of a rear-and-side road view of the first vehicle so as to obtain a road image every definite period of time; a monitoring area setting means 31-1 for setting a monitoring area in the road image for monitoring a second vehicle; an optical flow detecting means 31-2 for detecting an optical flow deriving from the second vehicle to be in the monitoring area in two serial road images so as to monitor a relative position between the first vehicle and the second vehicle; a rudder angle detecting means 51 for detecting a rudder angle of the first vehicle; and a speed detecting means 53 for detecting speed of the first vehicle, wherein the monitoring area setting means has a road form calculating means 31-7 for calculating a passed road form on the basis of a past rudder angle detected by the rudder angle detecting means and of a past speed detected by the speed detecting means and sets the monitoring area inside or outside an area enclosed with lines of the calculated road form, which lines include two lane marking positions where two lane markings on both sides of a first vehicle running lane in the road image cross a periphery of the road image.

According to the above-described structure, since the two lane marking positions, where the lane markings on both sides of the own vehicle running lane cross the periphery of the road image taken by the image taking means, is detected in advance and the passed road form in the road image is determined, the monitoring area can be set inside or outside an area enclosed with two curved lines, which start from the two lane marking positions, of the passed road form. Further, since the infinity point can be set simply and correctly, the monitoring area can be almost correctly set.

As an eighth aspect of the present invention, in the structure with the above first or seventh aspect, the monitoring area setting means selects the two lane marking positions correspondingly to the rudder angle of the first vehicle.

According to the above-described structure, since the monitoring area is set by selecting the two lane marking positions according to the own vehicle's rudder angle to have been detected, a part, of the monitoring area, near the own vehicle can be correct.

As a ninth aspect of the present invention, in the structure with the above seventh aspect, the monitoring area setting means has a rudder angle vs. lane marking position memorizing means 32-2 for memorizing the two lane marking positions correspondingly to the rudder angle of the first vehicle and decides the two lane marking positions corresponding to the rudder angle detected by the rudder angle detecting means by reading out the two lane marking positions from the rudder angle vs. lane marking position memorizing means.

According to the above-described structure, since the monitoring area is set accordingly to the two lane marking positions which are stored accordingly to the rudder angle and is read out correspondingly to the own vehicle's rudder angle, a part, of the monitoring area, near the own vehicle can be set only by detecting the own vehicle's rudder angle, without a bothersome calculation processing.

As a tenth aspect of the present invention, in the structure with any one of the above fifth, sixth, and seventh aspects, the monitoring area setting means decides the two lane marking positions by image-processing a periphery of the road image taken by the image taking means.

According to the above-described structure, since the monitoring area is set accordingly to the two lane marking positions which are stored accordingly to the rudder angle and is read out correspondingly to the own vehicle's rudder angle, a part, of the monitoring area, near the own vehicle can be set only by detecting the own vehicle's rudder angle, without a bothersome calculation processing.

And finally, in order to achieve the above-described object, as an eleventh aspect of the present invention and as shown in FIG. 1E, a vehicle-applied rear-and-side monitoring and alarming system to be set on a first vehicle includes: the vehicle-applied rear-and-side monitoring system with any one of the above preceding aspects, wherein the monitoring area is set outside the area enclosed with the lines; a blinker detecting means 52 for detecting an action and an indicating direction of a blinker; and an alarming means 40 for alarming a driver when a second vehicle exists within the monitoring area positioned in the indicating direction detected by the blinker detecting means as a result of monitoring the rear-and-side road view by means of the vehicle-applied rear-and-side monitoring system.

According to the above-described structure, since the monitoring area is set outside the area enclosed with the lines connecting the two lane marking positions to the infinity point without detecting the lane markings themselves, only a short processing time period for raising an alarm is required.

The above and other objects and features of the present invention will become more apparent from the following description taken in conjunction with the accompanying drawings.

BRIEF DESCRIPTION OF THE DRAWINGS

FIGS. 1A–1E are basic schemes of a vehicle-applied rear-and-side monitoring system and a vehicle-applied rear-and-side monitoring and alarming system in accordance with the present invention;

FIG. 2 is a block diagram showing the vehicle-applied rear-and-side monitoring and alarming system in accordance with the present invention;

FIG. 3 is a basic flow chart showing the vehicle-applied rear-and-side monitoring and alarming system in accordance with the present invention;

DESCRIPTION OF THE PREFERRED EMBODIMENTS

Embodiments of the present invention will now be described in further detail with reference to the accompanying drawings.

FIG. 2 is a block diagram showing the vehicle-applied rear-and-side monitoring and alarming system in accordance with the present invention, wherein 10 is an image taking portion to be an image taking means, 20 is a memory portion to keep image data and the like from the image taking portion 10, 30 is a data processing portion to execute, based on image information from the image taking portion 10, an image processing and a processing of monitoring a relative position with a following vehicle and so on, 40 is an alarming portion to be an alarming means to raise an alarm, and 50 is a signal input portion to input signal showing operation information of a running direction change of an own vehicle (hereinafter "the vehicle" or "the own vehicle").

Figure 13:
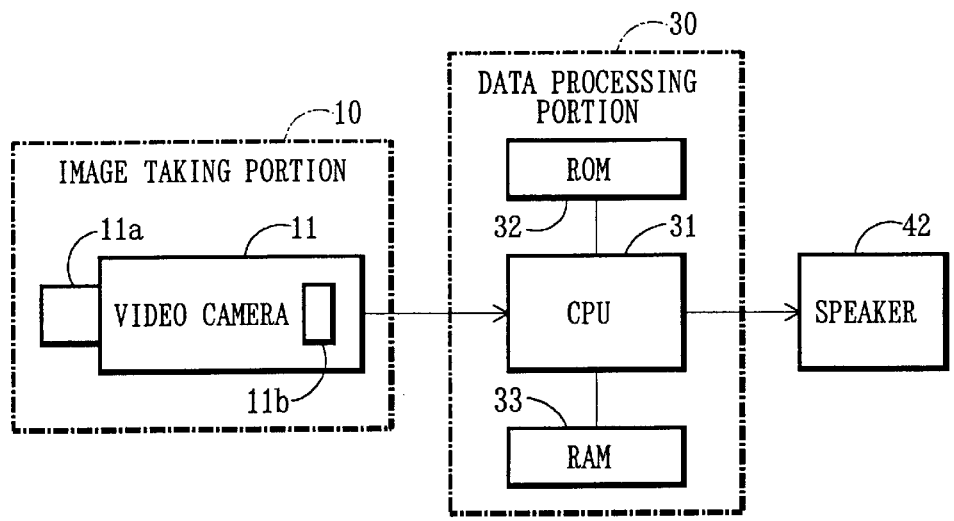
FIG. 13 is a block diagram showing a prior art vehicle-applied rear-and-side monitoring and alarming system.
Figure 16:
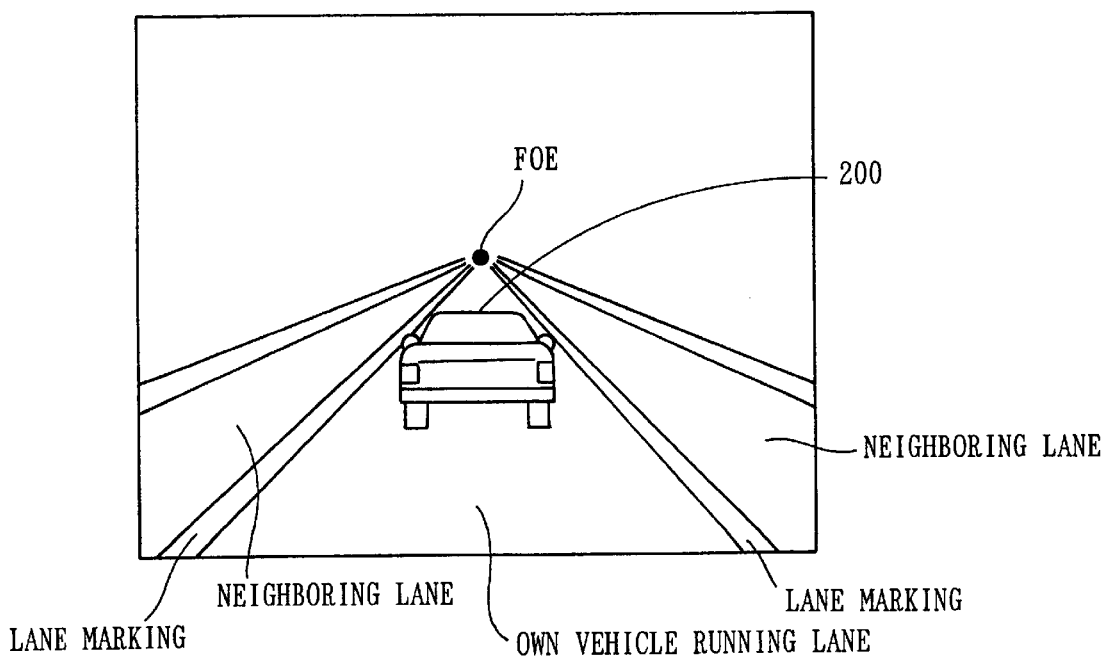
FIG. 16 is an explanatory illustration showing a road image of a six-lane highway.
Figure 14A:
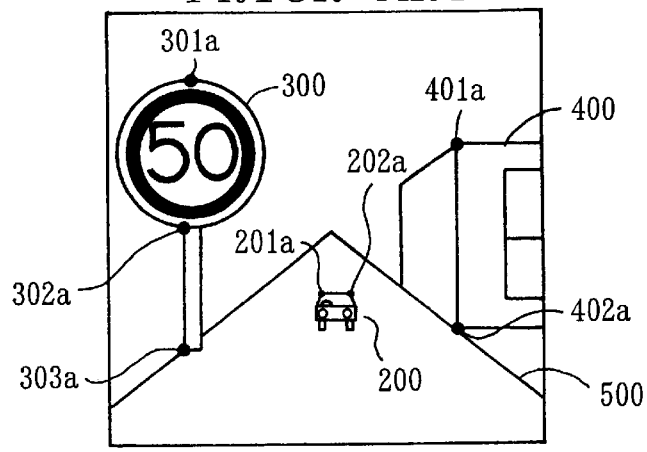
FIGS. 14A–14C are explanatory illustrations showing change of a rear-and-side road image taken by a video camera.
Figure 14B:
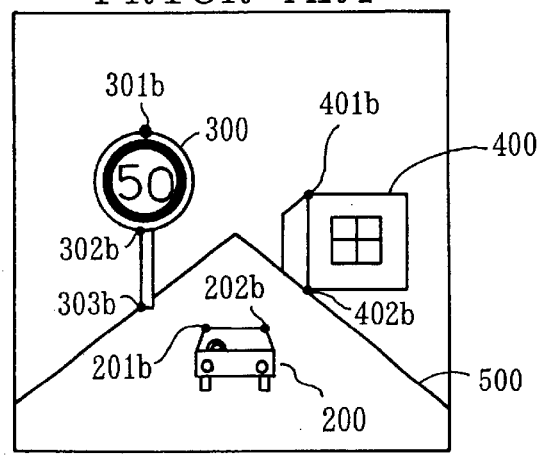
Figure 14C:
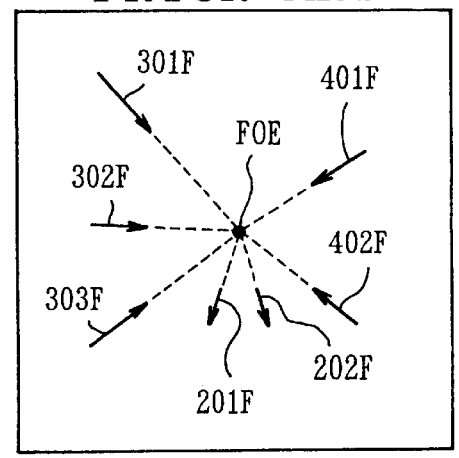
Figure 15:
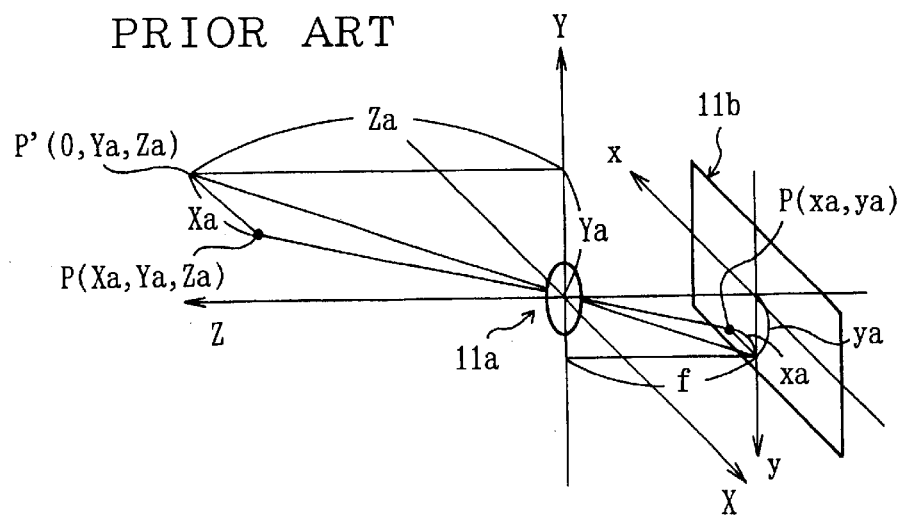
FIG. 15 is a theoretical scheme showing an optical arrangement.

The image taking portion 10 has a video camera 11. And, the video camera 11 has a lens (indicated with reference numeral 11a in FIG. 13) and an image plane (11b in FIG. 13).

And, the video camera 11 of the image taking portion 10 is mounted on a trunk portion or a rear end portion of the own vehicle and is directed rearward, which the video camera 11 is capable of taking an image of a rear-and-side road view of the vehicle and outputs rear-and-side road image information toward the CPU 31 (described later) of the data processing portion 30.

The memory portion 20 has a first frame memory 21 and a second frame memory 22, which keep the road image information from the image taking portion 10, and a diverging optical flow memory 23 to keep a diverging optical flow.

The first frame memory 21 and the second frame memory 22 consisting of the memory portion 20 are made of a matrix memory having picture elements of 512×512. And, the memories 21–23 are connected, with a read/write function, to the the CPU 31 of the data processing portion 30.

The data processing portion 30 has the CPU 31 (i.e. a central processing unit) to operate according to a program, ROM 32 to keep the program for the CPU 31 and a preset value, and RAM 33 to temporary keep required data for calculation by the CPU 31.

The alarming portion 40 has a display 41 and a speaker 42. The display 41 is made of LCD (i.e. a liquid crystal display) and the like, which display 41 displays an image taken by the video camera 11 or also displays a message of danger when the data processing portion 30 (CPU 31) has judged that there is a danger of scraping against the following vehicle so as to have a driver take notice of the danger. The speaker 42 raises a voice as a voice guidance or an alarm sound on the basis of an aural signal from the data processing portion 30 also so as to have the driver take notice of the danger.

The signal input portion 50 has a rudder angle sensor 51 to be a rudder angle detecting means which detects a steering angle as a rudder angle or a rudder angle itself of a rudder wheel (i.e. generally front wheels) and a blinker detecting switch 52 to be a blinker detecting means which detects operation and indicating direction of a blinker system by a driver. The rudder angle sensor 51 detects turning information of the vehicle, and the blinker detecting switch 52 detects turning indication information of the blinker system which is operated by a driver when the vehicle is going to turn right or left.

The operation of the present embodiment, namely the control operation by the data processing portion 30, will be described with reference to the main flow chart shown in FIG. 3.

First, an image taking processing is executed at Step S110, wherein the CPU 31 of the data processing portion 30 functions as the monitoring area setting means 31-1.

Figure 1A:
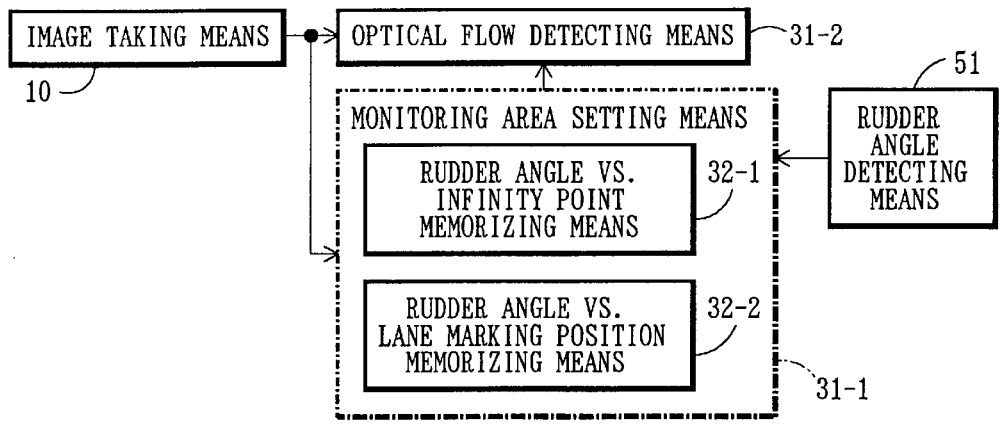
Figure 1B:
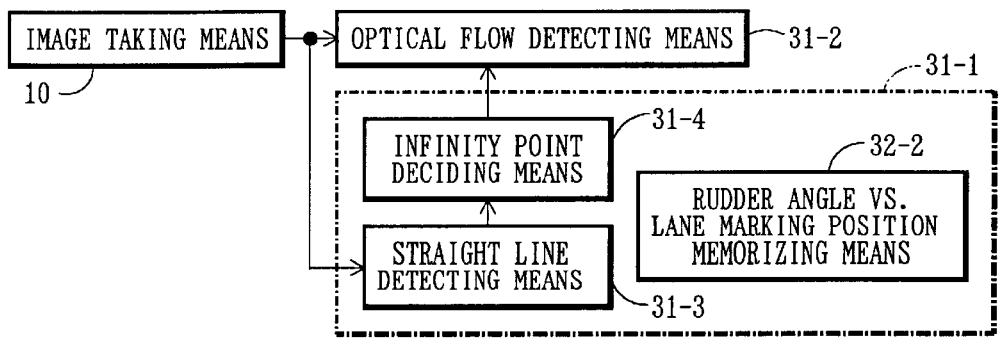
Figure 1C:
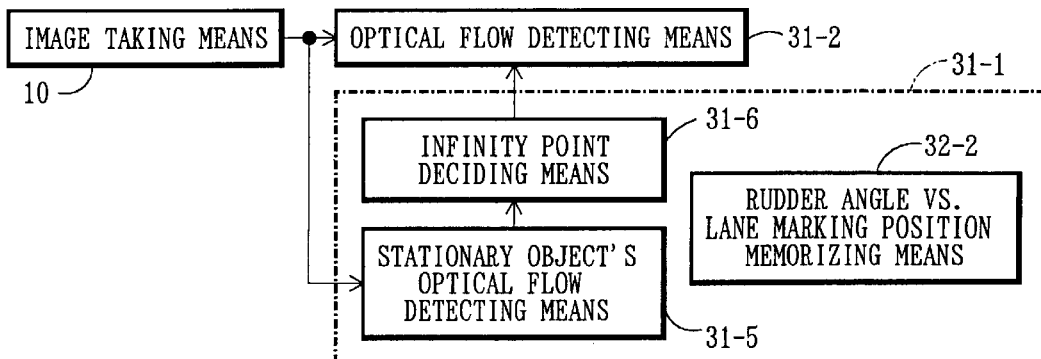
Figure 4:
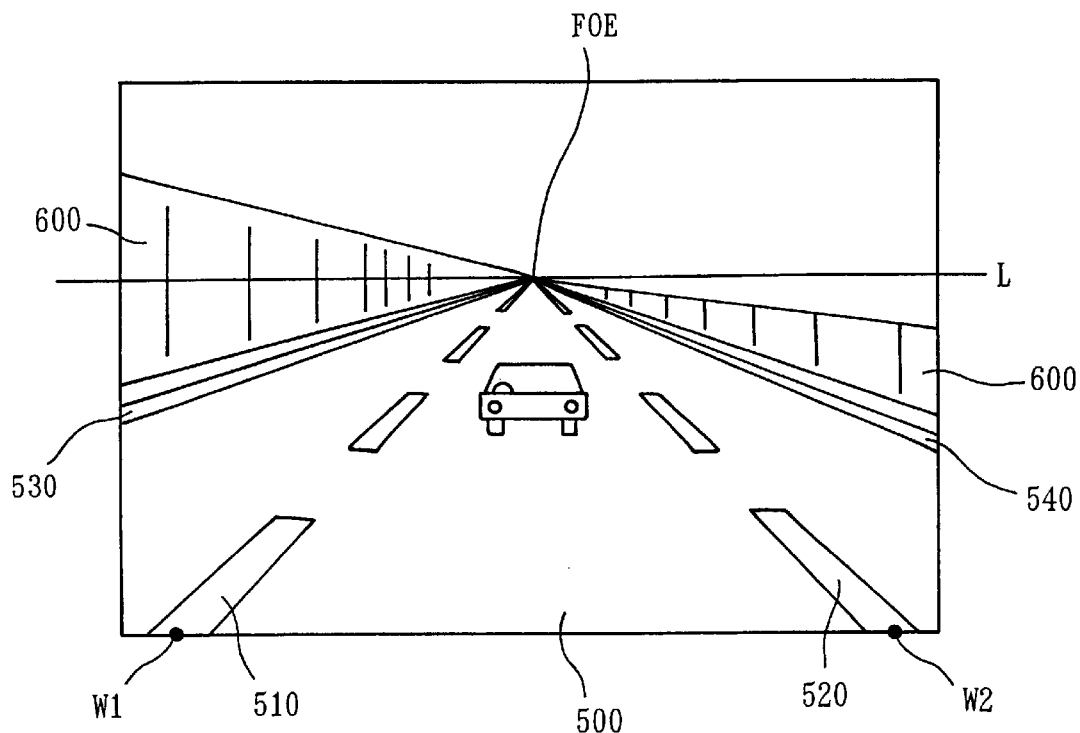
FIG. 4 is one example of a road image taken by a video camera in the vehicle-applied rear-and-side monitoring and alarming system in accordance with the present invention.

The image taking processing at Step S110 is of a process to take the image information required for setting the monitoring area and makes a rear-and-side road image shown in FIG. 4.

FIG. 4 is one example of a road image taken by a video camera 11 directed rearward and installed at a rear portion of the own vehicle running on a highway. As shown in FIG. 4, a road 500, lane markings 510 and 520 which are made of a broken line and separate an own vehicle running lane from its neighboring lanes, lane markings 530 and 540 which are made of serial lines and limit the traffic lanes, and walls 600 on both sides of the road 500 disappear at a point positioned in the horizontal center and at vertically ⅓ position from the top of the road image, which point is defined as FOE (Focus of Expansion).

And, the road image information is stored in the first frame memory 21 of the memory portion 20.

Since the video camera 11 is directed rearward, the right in the road image corresponds to the left in the running direction and the left in the road image corresponds to the right in the running direction. Hereinafter, right and left in the road image will be dealt with.

A FOE line L indicating vertical position of the above FOE is fixed to, for example, 100 m behind the vehicle according to a field angle of the video camera 11, an aberration of its lens, and setting parameters (i.e. height and dip) of the video camera 11 and the like. And, lane marking positions W1 and W2 where the lane markings 510 and 520 cross the periphery of the road image are also fixed according to the field angle of the video camera 11, the aberration of the lens, and setting parameters (i.e. height and dip) of the video camera 11 and the like. Therefore, the monitoring area of the own vehicle running lane can be set within an area enclosed with lines connecting the lane marking positions W1 and W2 to the FOE, i.e. an infinity point, and monitoring areas of the neighboring lanes can be set within areas enclosed with lines connecting the lane marking positions W1 and W2 and the FOE line L.

Figure 5:
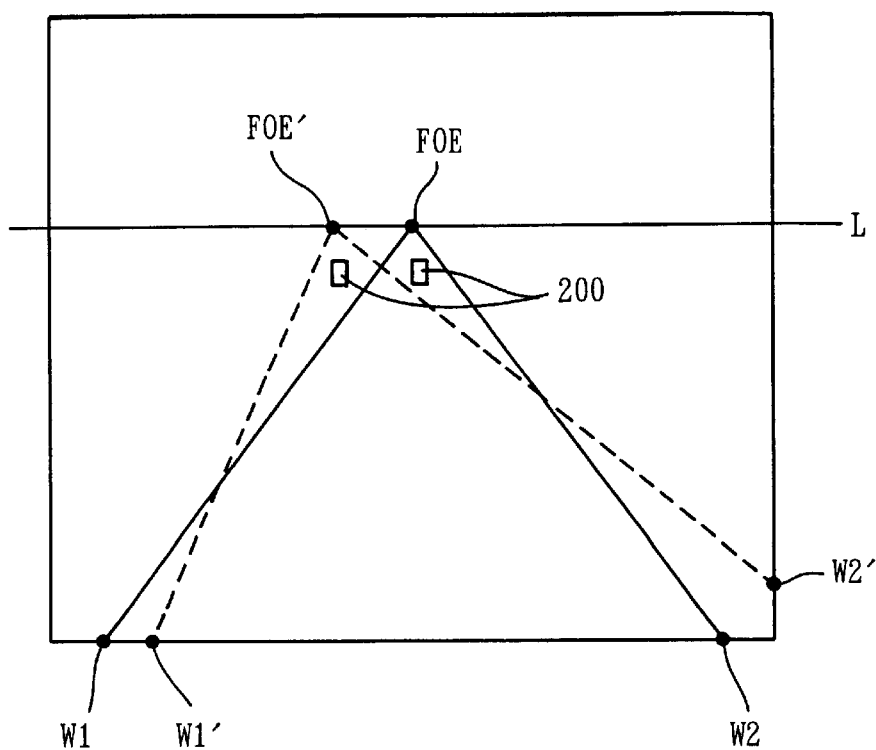
FIG. 5 is an explanatory illustration showing both of a FOE to shift according to a rudder angle and two lane marking positions where two lane markings cross a periphery of the road image.

Though the FOE line L does not change between serial two road images taken with a difference of a definite period of time even if the vehicle changes its running direction, the FOE changes its position between the above two serial road images if the vehicle changes its running direction. In case that the vehicle has turned right, the infinity point FOE in the preceding road image shifts to FOE' shown in FIG. 5. Though the lane marking positions W1 and W2 on the periphery of the image do not change as far as the vehicle is running straight in the middle of a straight lane, the lane marking positions W1 and W2 in the preceding road image shift to the new lane marking positions W1' and W2' shown in FIG. 5 in case that the vehicle has turned right.

If the monitoring area is fixedly set by the lane marking positions W1 and W2 and the infinity point FOE in spite that the own vehicle has changed its running direction, the following vehicle 200 which is running near the infinity point FOE, namely about 100 m behind the own vehicle, may be misjudged to be running on the own vehicle running lane even if the following vehicle 200 is actually running on the neighboring lane because an image of the following vehicle 200 is very small. On the contrary, the following vehicle 200 running on the own vehicle running lane may be misjudged to be running on the neighboring lane. An area including the following vehicle running near the own vehicle can be, however, correctly judged even if the lane marking positions W1 and W2 are used instead of the new lane marking positions W1' and W2' because the image of the following vehicle is relatively large.

Accordingly, even if the running direction of the vehicle changes, the following vehicle 200 can be correctly monitored, whichever lanes, namely the own vehicle running lane or the neighboring lanes, the following vehicle 200 is running by setting a monitoring area for the own vehicle running lane and another monitoring area for the neighboring lanes inside and outside, respectively, the area enclosed with lines connecting the lane marking positions W1 and W2 to the FOE' as a substitute of the FOE. Preferably, the above monitoring areas shall be strictly set inside and outside, respectively, the area enclosed with lines connecting the new lane marking positions W1' and W2' to the FOE'.

Figures 6, 7, 8:
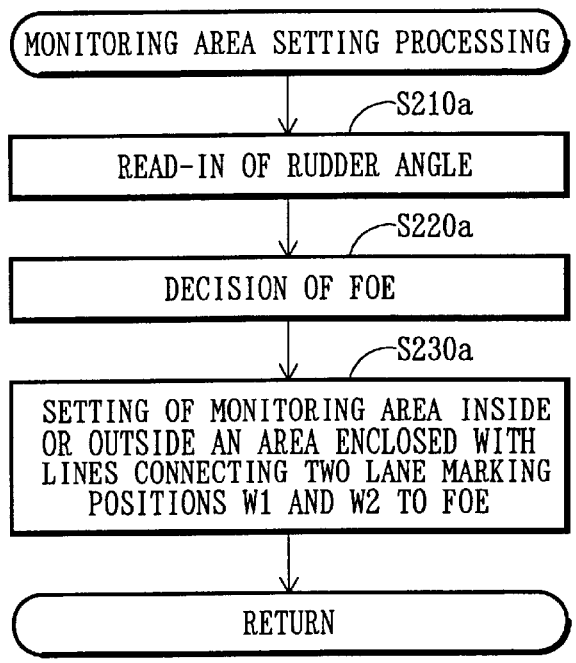
FIG. 6 is a table showing data, stored in RAM, of rudder angles versus. infinity points.
FIG. 7 is a table showing data, stored in RAM, of rudder angles versus. infinity points and lane marking positions.
FIG. 8 is a flow chart of one example of a monitoring area setting process.

Though movement of the FOE (the infinity point), i.e. ΔFOE, can be obtained with a calculation of multiplying a rudder angle, which decides a variation in running direction, by a specified proportionality constant since the ΔFOE is proportional to a variation in running direction of the own vehicle, the ΔFOE can be determined by reading out the ΔFOE addressed with the rudder angle, while having a table of rudder angle vs. ΔFOE as a rudder angle vs. infinity point memorizing means 32-1 in the ROM 32 as shown in FIG. 6. The former does not require a storage area in ROM, and the latter does not require calculation and therefore is suitable for high speed processing.

On the other hand, though movement of the lane marking positions W1 and W2 can be obtained with a calculation of multiplying the rudder angle by a specified proportionality constant since the movement of the lane marking positions W1 and W2 is proportional to a variation in running direction of the own vehicle, the new lane marking positions W1' and W2' can be determined by reading out the new lane marking positions W1' and W2' addressed with the rudder angle, while having a table of rudder angle and ΔFOE vs. the coordinates of new lane marking positions W1' and W2', which have calculated, as a rudder angle vs. lane marking position memorizing means 32-2 in the ROM 32 as shown in FIG. 7.

Next, a monitoring area setting processing is executed at Step S120. The monitoring area setting processing is executed according to the flow chart shown in FIG. 8.

Figure 9:
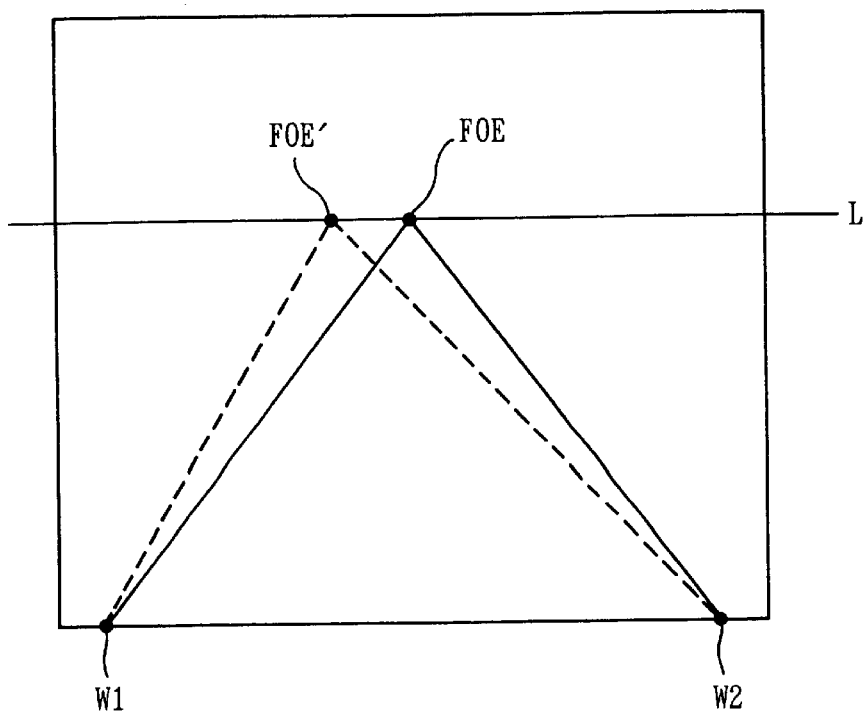
FIG. 9 is an explanatory illustration showing one example of a monitoring area setting method.

In the monitoring area setting processing, first, the rudder angle data, to which the analog to digital conversion has been executed to the rudder angle signal from the sensor 51, is read out at Step S210a, and the rudder angle is detected. Next, at Step S220a, ΔFOE is read out from the table of FIG. 6 according to the rudder angle to be used as the address, and the new infinity point FOE' having moved by ΔFOE is decided. And, at Step S230a, the monitoring area is set inside or outside an area enclosed with lines connecting the lane marking positions W1 and W2 to the infinity point FOE' decided at Step S220a, as is shown in FIG. 9.

Though the lane marking positions of W1 and W2 is used in the flow chart of FIG. 8. However, the lane marking positions W1' and W2' which shift according to the rudder angle may be used at Step S230a by reading out the lane marking positions W1' and W2' from the table of FIG. 7 according to the rudder angle. And, the monitoring area can be similarly set inside or outside an area enclosed with lines connecting the lane marking positions W1' and W2' to the infinity point FOE' decided at Step S220a.

Figure 10:
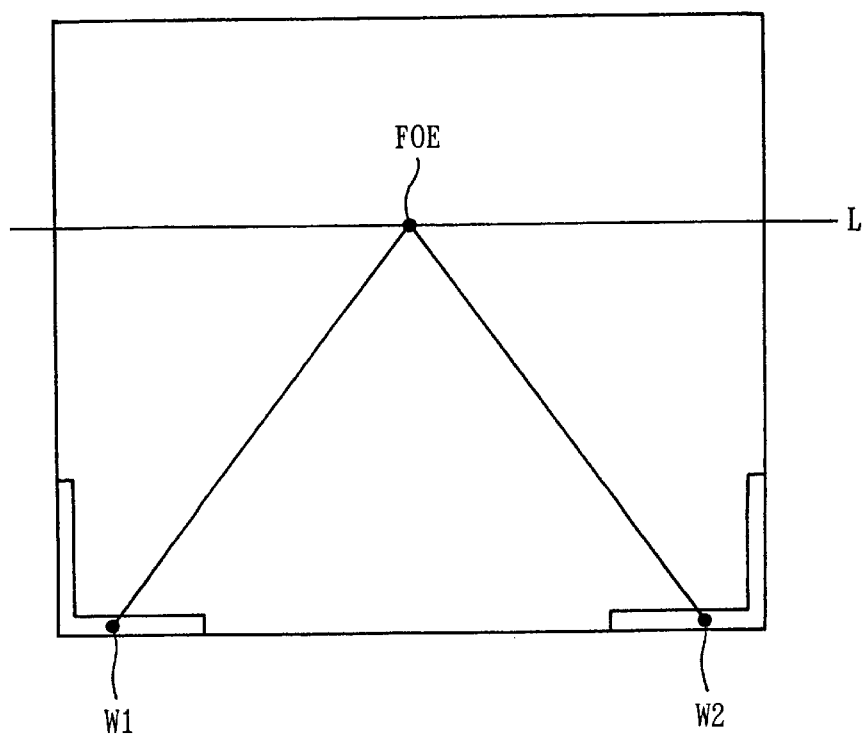
FIG. 10 is an explanatory illustration showing one example of a lane marking positions deciding method.

As shown in FIG. 10, a small image processing area, corresponding to an area where the lane marking positions move about, may be provided along the periphery of the road image so that the lane marking positions W1' and W2' are detected by the image processing of the image processing area due to higher luminance of the two lane marking positions than that of the other part.

One method of deciding the infinity point FOE is that a plurality of straight lines of the lane marking 530 and 540, the walls 600, and the like on the road 500 are detected after executing an edge processing and Hough transform for the road image and an intersection of the straight lines are decided as the infinity point. As another method of deciding the infinity point FOE, a plurality of optical flows of stationary objects in serial two road images are detected, and a convergent point of the optical flows is decided as the infinity point.

For executing the former, the CPU 31 of the data processing portion 30 functions as a straight line detecting means 31-3 which operates on the fixed program and detects the plurality of straight lines by executing the edge processing for the road image taken by the video camera 11 and also functions as an infinity point deciding means 31-4 which decides the intersection of the straight lines as the infinity point in the road image. Here, the processing for detecting the straight line itself is generally known. On the other hand, for executing the latter, the CPU 31 functions as a stationary object's optical flow detecting means 31-5 which operates on the fixed program and detects the plurality of optical flows of stationary objects in serial two road images taken by the video camera 11 and also functions as an infinity point deciding means 31-6 which decides the intersection of the optical flows as the infinity point in the road image. Here, the processing for detecting the optical flow is generally known.

As is described above with reference to FIG. 5, if the running direction of the vehicle changes, the FOE changes its position between the two serial road images. When the vehicle is running on a curved road, the own vehicle running lane and the neighboring lanes gradually deviate from the FOE in the preceding road image as the rudder angle of the vehicle should be continuously kept almost constant. Therefore, as described above, if the monitoring area is fixedly set by the lane marking positions W1 and W2 and the infinity point FOE in spite that the own vehicle has changed its running direction, the following vehicle 200 which is running about 100 m behind the own vehicle can not be judged its position correctly.

Therefore, the monitoring area is set by calculating the road form, on which the own vehicle has run, by the past rudder angle and the past speed during the past 100 m. That is, the monitoring area is set with the calculated road form and the two lane marking positions which cross the periphery of the road image.

Figure 12:
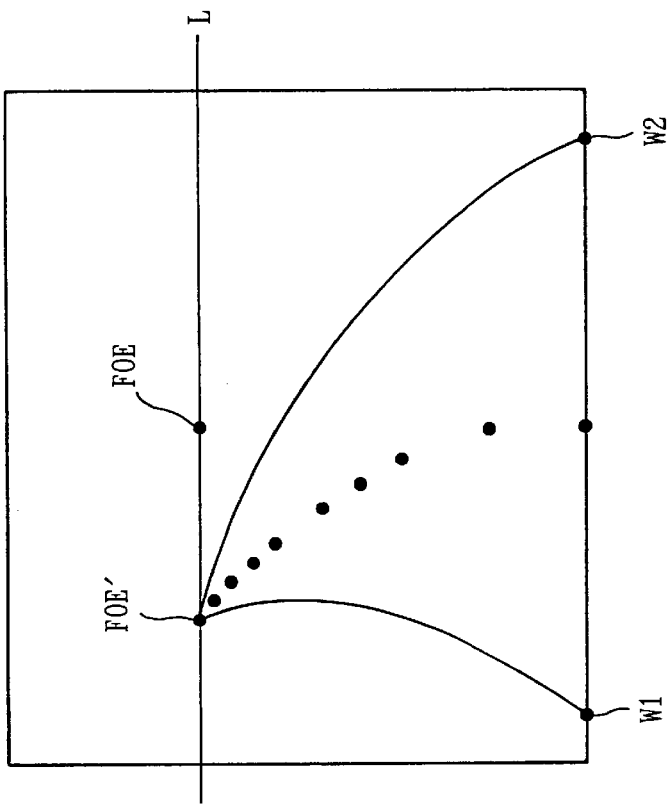
FIG. 12 is an explanatory illustration showing a monitoring area being set with a road form calculated by the passed road form calculating method of FIG. 11.
Figure 11:
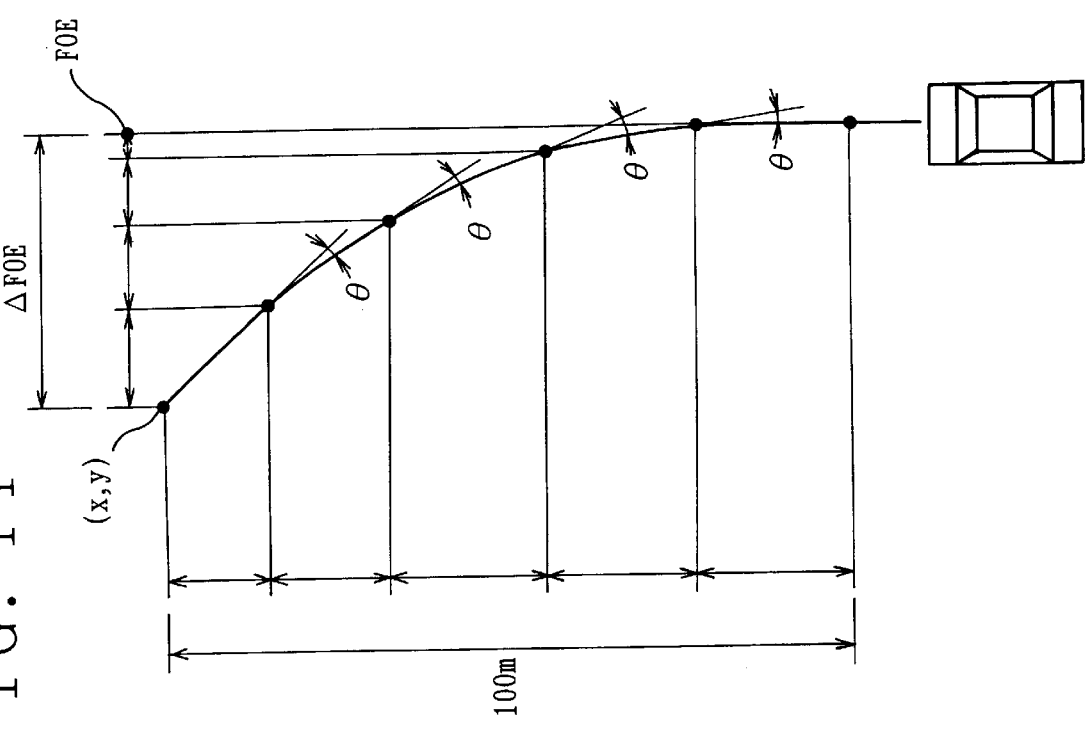
FIG. 11 is a theoretical scheme showing one example of a passed road form calculating method.

For the purpose of calculating the road form, as shown in FIG. 11, the rudder angle θ is obtained from the rudder angle signal from the rudder angle sensor 51 to be the rudder angle detecting means of the signal input portion 50, the vehicle speed v is detected by the speed signal from a speed sensor (not shown) to be a speed detecting means 53 of the signal input portion 50, and the coordinates (x,y) of the following vehicle in the road image is obtained in order, whereby both of a variation, i.e. ΔFOE, between the present FOE and a position of the own vehicle running lane at 100 m behind the present position of the own vehicle and locus information are obtained, every definite period of time when the road image is taken. And, as shown in FIG. 12, monitoring areas corresponding to the own vehicle running lane and the neighboring lanes, respectively, are set inside and outside areas, respectively, enclosed with curved lines, which are made by connecting the coordinates of both lane markings of the own vehicle running lane, connecting the two lane marking positions W1 and W2 to the FOE'. Accordingly, the CPU 31 functions as a road form calculating means 31-7 which operates with a fixed program and calculates the passed road form with use of the past rudder angle detected by the rudder angle sensor 51 and the past speed detected by the speed sensor.

After setting the monitoring area by one of the above-described methods, an optical flow detection processing at Step S130 in the flow chart of FIG. 3 is executed.

The CPU 31 functions as an optical flow detecting means 31-2 which operates with a fixed program and detects the optical flow of the following vehicle in the monitoring area, which optical flow is obtained from the two serial road images taken by the video camera 11. The optical flow detection processing is applied to the monitoring area being set at Step S120. And, in case that the monitoring area is set on the two neighboring lanes on both sides of the own vehicle running lane, the image is taken a determined time period Δt later than the road image having stored in the first frame memory 21, and the same monitoring area is set for the image having stored in the second frame memory 22. And, movement of an imaging point in the serial road images at time t and t+Δt is detected as an optical flow at Step S130.

Calculation of degree of danger is executed at Step S140. That is, optical flows, detected at the above Step S130, in a diverging direction such as the optical flows 201F and 202F are weighed according to size (i.e. length) and given the numerical value.

Here, several threshold values may be decided in order to give level to the degree of danger at this calculation processing.

At Step S150 following the above Step S140, it is judged to be dangerous in case that the degree of danger exceeds a preset threshold value. If several threshold values are given, degree of danger is judged accordingly.

In case that it has been judged to be dangerous, alarming process is executed at Step S160, and in case that it has been judged to be not dangerous, the system returns to Step S110.

In the alarming process at Step S160, an aural signal is sent out to a speaker 42 of the alarming portion 40, and the speaker 42 produces a voice guidance or an alarm sound, while a display 41 indicates a message or the like for alarming a driver of the own vehicle.

In case that level of degree of danger is very high, a braking system of the own vehicle operates.

And, a series of processing finishes with the finish of Step S160, and the system returns to Step S110.

Although the present invention has been fully described by way of examples with reference to the accompanying drawings, it is to be noted that various changes and modifications will be apparent to those skilled in the art. Therefore, unless otherwise such is changes and modifications depart from the scope of the present invention, they should be construed as being included therein.

What is claimed is:

1. A vehicle-applied rear-and-side monitoring system, said monitoring system being set on a first vehicle, comprising:
    an image taking means for taking an image of a rear-and-side road view of the first vehicle so as to obtain a road image every definite period of time;
    a monitoring area setting means for setting a monitoring area in the road image for monitoring a second vehicle;
    an optical flow detecting means for detecting an optical flow deriving from the second vehicle to be in the monitoring area in two serial road images so as to monitor a relative position between the first vehicle and the second vehicle; and
    a rudder angle detecting means for detecting a rudder angle of the first vehicle, said rudder angle indicating a turning direction of said first vehicle,
    wherein the monitoring area setting means sets the monitoring area inside or outside an area enclosed with lines connecting two lane marking positions, where two lane markings on both sides of a first vehicle running lane in the road image cross a periphery of the road image, to an infinity point in the road image, said infinity point corresponding to the rudder angle detected by the rudder angle detecting means.

2. The vehicle-applied rear-and-side monitoring system according to claim 1, wherein
    the monitoring area setting means
    has a rudder angle versus infinity point memorizing means for memorizing the infinity point correspondingly to the rudder angle of the first vehicle and
    decides the infinity point correspondingly to the rudder angle detected by the rudder angle detecting means by reading out the infinity point the from the rudder angle versus infinity point memorizing means.

3. The vehicle-applied rear-and-said monitoring system according to claim 1, wherein
    the monitoring area setting means
    has a rudder angle versus lane making position memorizing means for memorizing the two lane marking positions correspondingly to the rudder angle of the first vehicle and
    decides the two lane marking positions corresponding to the rudder angle detected by the rudder angle detecting means by reading out the two lane marking positions from the rudder angle versus lane marking position memorizing means.

4. The vehicle-applied rear-and-side monitoring system according to claim 2, wherein
    the monitoring area setting means
    has a rudder angle versus lane marking position memorizing means for memorizing the two lane marking positions correspondingly to the rudder angle of the first vehicle and
    decides the two lane marking positions corresponding to the rudder angle detected by the rudder angle detecting means by reading out the two lane marking positions from the rudder angle versus lane marking position memorizing means.

5. The vehicle-applied rear-and-side monitoring system according to claim 1, wherein
    the monitoring area setting means
    decides the two lane marking positions by image-processing a periphery of the road image taken by the image taking means.

6. The vehicle-applied rear-and-side monitoring system according to claim 2, wherein
    the monitoring area setting means
    decides the two lane marking positions by image-processing a periphery of the road image taken by the image taking means.

7. A vehicle-applied rear-and-side monitoring system, said monitoring system being set on a first vehicle, comprising:
    an image taking means for taking an image of a rear-and-side road view of the first vehicle so as to obtain a road image every definite period of time;
    a monitoring area setting means for setting a monitoring area in the road image for monitoring a second vehicle; and an optical flow detecting means for detecting an optical flow deriving from the second vehicle to be in the monitoring area in two serial road images so as to monitor a relative position between the first vehicle and the second vehicle, wherein the monitoring area setting means has a straight line detecting means for detecting a plurality of straight lines by executing an edge processing to the road image and an infinity point deciding means for deciding an intersection of the plurality of straight lines as an infinity point in the road image and sets the monitoring area inside or outside an area enclosed with lines connecting two lane marking positions, where two lane markings on both sides of a first vehicle running lane in the road image cross a periphery of the road image, to the infinity point in the road image.

8. A vehicle-applied rear-and-side monitoring system, said monitoring system being set on a first vehicle, comprising:

an image taking means for taking an image of a rear-and-side road view of the first vehicle so as to obtain a road image every definite period of time;

a monitoring area setting means for setting a monitoring area in the road image for monitoring a second vehicle; and an optical flow detecting means for detecting an optical flow deriving from the second vehicle to be in the monitoring area in two serial road images so as to monitor a relative position between the first vehicle and the second vehicle, wherein the monitoring area setting means has a stationary object's optical flow detecting means for detecting a plurality of optical flows deriving from stationary objects in two serial road images and an infinity point deciding means for deciding a convergent point of the plurality of optical flows as an infinity point in the road image and sets the monitoring area inside or outside an area enclosed with lines connecting two lane marking positions, where two lane markings on both sides of a first vehicle running lane in the road image cross a periphery of the road image, to the infinity point in the road image.

9. A vehicle-applied rear-and-side monitoring system, said monitoring system being set on a first vehicle, comprising:

an image taking means for taking an image of a rear-and-side road view of the first vehicle so as to obtain a road image every definite period of time;

a monitoring area setting means for setting a monitoring area in the road image for monitoring a second vehicle;

an optical flow detecting means for detecting an optical flow deriving from the second vehicle to be in the monitoring area in two serial road images so as to monitor a relative position between the first vehicle and the second vehicle;

a rudder angle detecting means for detecting a rudder angle of the first vehicle, said rudder angle indicating a turning direction of the first vehicle; and a speed detecting means for detecting speed of the first vehicle, wherein the monitoring area setting means has a road form calculating means for calculating a passed road form on the basis of a past rudder angle detected by the rudder angle detecting means and of a past speed detected by the speed detecting means and sets the monitoring area inside or outside an area enclosed with lines of the calculated road form, which lines include two lane marking positions where two lane markings on both sides of a first vehicle running lane in the road image cross a periphery of the road image.

10. The vehicle-applied rear-and-side monitoring system according to claim 1, wherein the monitoring area setting means selects the two lane marking positions correspondingly to the rudder angle of the first vehicle.

11. The vehicle-applied rear-and-side monitoring system according to claim 9, wherein the monitoring area setting means selects the two lane marking positions correspondingly to the rudder angle of the first vehicle.

12. The vehicle-applied rear-and-side monitoring system according to claim 9, wherein the monitoring area setting means has a rudder angle vs. lane marking position memorizing means for memorizing the two lane marking positions correspondingly to the rudder angle of the first vehicle and decides the two lane marking positions corresponding to the rudder angle detected by the rudder angle detecting means by reading out the two lane marking positions from the rudder angle vs. lane marking position memorizing means.

13. The vehicle-applied rear-and-side monitoring system according to claim 7, wherein the monitoring area setting means decides the two lane marking positions by image-processing a periphery of the road image taken by the image taking means.

14. The vehicle-applied rear-and-side monitoring system according to claim 8, wherein the monitoring area setting means decides the two lane marking positions by image-processing a periphery of the road image taken by the image taking means.

15. The vehicle-applied rear-and-side monitoring system according to claim 9, wherein the monitoring area setting means decides the two lane marking positions by image-processing a periphery of the road image taken by the image taking means.

16. A vehicle-applied rear-and-side monitoring and alarming system, said monitoring and alarming system being set on a first vehicle, comprising:

the vehicle-applied rear-and-side monitoring system according to any one of claims 1–15, wherein the monitoring area is set outside the area enclosed with the lines;

a blinker detecting means for detecting an action and an indicating direction of a blinker; and an alarming means for alarming a driver when a second vehicle exists within the monitoring area positioned in the indicating direction detected by the blinker detecting means as a result of monitoring the rear-and-side road view by means of the vehicle-applied rear-and-side monitoring system.

* * * * *